(12) United States Patent
Matsushita

(10) Patent No.: US 8,227,075 B2
(45) Date of Patent: Jul. 24, 2012

(54) FOAMED PRODUCT AND MANUFACTURING METHOD OF THE SAME

(75) Inventor: Takamichi Matsushita, Tokyo (JP)

(73) Assignee: Kankyokeieisogokenkyusho Co., Inc., Tokyo (JP)

( * ) Notice: Subject to any disclaimer, the term of this patent is extended or adjusted under 35 U.S.C. 154(b) by 0 days.

(21) Appl. No.: 12/926,160

(22) Filed: Oct. 28, 2010

(65) Prior Publication Data

US 2011/0244217 A1    Oct. 6, 2011

(30) Foreign Application Priority Data

Apr. 2, 2010  (JP) ................................ 2010-085979

(51) Int. Cl.
*B32B 5/22* (2006.01)
*B32B 37/00* (2006.01)

(52) U.S. Cl. ............... 428/317.9; 428/318.6; 428/318.8; 521/51; 264/45.5

(58) Field of Classification Search ............... 428/317.9, 428/318.6, 318.8; 521/51; 264/45.5
See application file for complete search history.

(56) References Cited

U.S. PATENT DOCUMENTS

| | | | | |
|---|---|---|---|---|
| 6,596,814 B2 * | 7/2003 | Kim et al. | ...................... | 525/191 |
| 2004/0062885 A1 * | 4/2004 | Imanari et al. | ............... | 428/34.1 |
| 2005/0118405 A1 * | 6/2005 | Gotoh | ......................... | 428/304.4 |
| 2007/0004861 A1 * | 1/2007 | Cai et al. | ........................ | 525/192 |
| 2009/0124717 A1 | 5/2009 | Uehara | | |
| 2010/0227149 A1 * | 9/2010 | Koo et al. | ................... | 428/304.4 |
| 2011/0105667 A1 * | 5/2011 | Brenner et al. | ................ | 524/423 |
| 2011/0244180 A1 * | 10/2011 | Matsushita | .................... | 428/136 |
| 2011/0244195 A1 * | 10/2011 | Matsushita | .................... | 428/188 |
| 2011/0244223 A1 * | 10/2011 | Matsushita | .................... | 428/336 |

FOREIGN PATENT DOCUMENTS

| | | |
|---|---|---|
| EP | 1 380 401 A1 | 1/2004 |
| JP | 08-074345 | 3/1996 |
| JP | 2003-002997 | 1/2003 |
| JP | 2003-041041 | 2/2003 |
| JP | 2003-335886 | 11/2003 |
| JP | 2004-352822 | 12/2004 |
| JP | 2004-358328 | 12/2004 |

* cited by examiner

*Primary Examiner* — Hai Vo
(74) *Attorney, Agent, or Firm* — Paul A. Guss

(57) ABSTRACT

A foamed product that generates no smoke when incinerated, has a low calorific value, and achieves a desired dimension and thermal insulation performance is provided. A foamed product 1 is formed by heat-mixing, in an extruder 11, a paper pellet 7 that is a mixture of a fine paper powder having a particle diameter of 30 to 200 μm and starch, a container recycle pellet 8 that is a mixture of polypropylene, polyethylene, and polystyrene, foamable polypropylene 9, and water 10. A weight distribution is set so that the paper pellet 7 is 50 to 65% by weight, the container recycle pellet 8 is 15 to 25% by weight, the foamable polypropylene 9 is 10 to 30% by weight, and the water 10 is 10 to 20% by weight to these resins and other materials.

5 Claims, 4 Drawing Sheets

FOAMED PRODUCT AND MANUFACTURING METHOD OF THE SAME

BACKGROUND OF THE INVENTION

1. Field of the Invention

The present invention relates to a foamed product suitable for a heat insulator, a shock absorber, and the like, and to a manufacturing method of the foamed product.

2. Description of the Related Art

Currently, various types of foams and the like are used as heat insulators or cushioning media. For example, as a heat insulator for residential thermal insulation, a mineral-based heat insulator such as glass wool or rock wool, a plastic-based heat insulator such as rigid urethane foam or extruded polystyrene foam, or a heat insulator using a natural ingredient such as cellulose fibers or carbonized foam cork is put to use.

Patent Document 1 listed below discloses, as a residential heat insulator, a plate-like heat insulator that is fit between support members such as floor joists, pillars, and ceiling joists and composed of a foamed styrene resin molding or a rigid polyurethane foam.

[Patent Document 1] Japanese Patent Application Laid-Open No. H08-74345

[Patent Document 2] Japanese Patent Application Laid-Open No. 2003-41041

SUMMARY OF THE INVENTION

The heat insulator disclosed in above-mentioned Patent Document 1 is a plastic-based heat insulator, which has a significant environmental burden upon manufacture or disposal. For instance, a foamed styrene resin molding has a large carbon number due to its molecular structure. Accordingly, remaining carbon that cannot react with oxygen burns incompletely and becomes soot, causing generation of smoke during incineration. Besides, foamed polystyrene is about 9000 to 10000 cal/g in calorific value, that is, has a high calorific value per unit weight.

Moreover, these heat insulators are made fire-retardant by mixing a fire-retardant material into raw materials, which causes emission of toxic gas when burned. This raises a possibility of damage by toxic gas in the case of fire. Furthermore, since these heat insulators are high in calorific value, there is a possibility that an incinerator is damaged upon disposal.

On the other hand, in Patent Document 2, the present inventors provide a foam member that generates no smoke when incinerated and has a low calorific value, and a manufacturing method of the foam member. If such a foam member can be employed as a residential heat insulator, a heat insulator without a significant environmental burden upon manufacture or disposal can be obtained.

In view of this, the present inventors attempted to extrude the foam member disclosed in Patent Document 2, by an extruder having a width dimension for a residential heat insulator. In detail, polypropylene, a fine paper powder of 30 to 100 µm in average particle diameter, and starch of 5 to 150 µm in average particle diameter were supplied to the extruder and mixed together under heat, and further water was mixed into the high-temperature molten mixture to manufacture the foam member. A weight ratio of polypropylene, the fine paper powder, and starch is such that polypropylene is 25% by weight, the fine paper powder is 55% by weight, and starch is 25% by weight. A weight ratio of water to the molten mixture is 25% by weight.

However, molding the foam member disclosed in Patent Document 2 by the extruder resulted in a failure to attain a desired width dimension. As a result of investigating the cause of the failure, the present inventors found the cause to be an insufficient foam volume as a foamed product.

The present inventors then used foamable polypropylene suitable for a foamed product, as polypropylene which is a resin raw material of a foamed product. As a result, a sufficient foam volume was attained, enabling a foamed product of a desired dimension to be obtained. However, the obtained foamed product lacked sufficient thermal insulation performance, and was unable to be used as a residential heat insulator.

The present invention has an object of providing a foamed product that generates no smoke when incinerated, has a low calorific value, and achieves a desired dimension and thermal insulation performance.

As a result of further conducting intense study, the present inventors found that desired foaming and thermal insulation performance can be achieved by mixing, at a predetermined ratio, a recycled resin which is a mixture of a polyethylene resin, a polypropylene resin, and a polystyrene resin, into foamable polypropylene which is a resin raw material of a foamed product.

A foamed product according to the present invention is a foamed product formed by heat-mixing and foaming: a paper pellet that is a mixture of 35 to 50% by weight of a fine paper powder having a particle diameter of 30 to 200 µm and 50 to 65% by weight of a hydrophilic macromolecule; a recycled resin that is a mixture of 55 to 65% by weight of a recycled polypropylene resin, 30 to 40% by weight of a recycled polyethylene resin, and 1 to 5% by weight of a recycled polystyrene resin; a foamable polypropylene resin; and water, wherein the paper pellet is 50 to 65% by weight, the recycled resin is 15 to 25% by weight, and the foamable polypropylene resin is 10 to 30% by weight, the water is in a range of 10 to 20% by weight to the paper pellet, the recycled resin, and the foamable polypropylene resin, the foamed product is formed by tightly connecting surfaces of a plurality of rod-like elements, wherein each of the rod-like elements has, on a surface thereof, a skin layer having no bubbles, the skin layer covering an inside foam layer, and the skin layer is 15 to 25 µm in average thickness.

With the above-mentioned range of weight distribution of each raw material, the foamed product according to the present invention can achieve a desired dimension and thermal insulation performance as a residential heat insulator. Moreover, the foamed product can be manufactured using, as the recycled resin, a container recycle pellet (hereafter abbreviated as "container re-pellet").

The container re-pellet is a pellet formed in order to reuse food containers or daily commodity containers (e.g., shampoo containers, detergent containers, and so on) after cleaning and the like, and inevitably includes polypropylene, polyethylene, and polystyrene. Polypropylene and polyethylene are both a polyolefin-based resin, which is considered to emit no toxic gas when burned. Hence, polypropylene and polyethylene are extensively used for food containers and daily commodity containers. However, despite an effort to mix the two resins, they do not mix with each other, so that the mixture cannot be molded.

Therefore, though the container re-pellet that inevitably includes the two resins is produced in large quantity due to increased recycling activities in recent years, demand for the container re-pellet is low because it cannot be used as a raw material in ordinary plastic molding factories. Besides, various additives are added to each resin according to container applications. This being so, when the container re-pellet is used as a molding raw material, a molded object will end up being unstable in quality. For these reasons, the container re-pellet has not been used as a molding raw material.

The foamed product according to the present invention uses such a container re-pellet as a raw material, where polypropylene and polyethylene are uniformly mixed, with there being no unevenness in quality. Moreover, though desired performance as a heat insulator cannot be attained when simply using foamable polypropylene as a raw material, the use of the container re-pellet enables a foamed product of high thermal insulation performance to be obtained.

Thus, the foamed product according to the present invention includes, as a raw material, at least 50% by weight of the paper pellet having a low calorific value, and so is low in calorific value. In addition, the present inventors conducted a burning test on the foamed product according to the present invention, and found no toxic smoke. Moreover, the foamed product according to the present invention can achieve a desired dimension and thermal insulation performance. Furthermore, since the container re-pellet which has conventionally been low in demand can be used as a raw material, container recycling can be promoted.

As a result of mixing each raw material at the above-mentioned ratio and foaming the mixture, the skin layer thickness was 15 to 25 µm on average in the foamed product according to the present invention. In the case of using only foamable polypropylene mentioned above, the skin layer thickness was about 10 µm on average, and also the appearance was clearly different. Hence, the foamed product according to the present invention exhibits high mechanical strength and high thermal insulation performance.

Moreover, in the foamed product according to the present invention, the skin layer and the foam layer are made by uniformly mixing the recycled polypropylene resin and the foamable polypropylene resin with the recycled polyethylene resin. For example, whether or not each resin is uniformly mixed can be checked through analysis using an infrared absorption spectrum.

Moreover, a manufacturing method of a foamed product according to the present invention is a method of manufacturing a foamed product by charging a paper pellet, a recycled resin, a foamable polypropylene resin, and water into an extruder and extruding charged materials from a die provided on an extrusion side of the extruder, the paper pellet being a mixture of a fine paper powder having a particle diameter of 30 to 200 µm, a hydrophilic macromolecule, and water, and the recycled resin being a mixture of a polyethylene resin, a polypropylene resin, and a polystyrene resin, wherein the paper pellet includes 35 to 50% by weight of the fine paper powder and 50 to 65% by weight of the hydrophilic macromolecule, the recycled resin includes 55 to 65% by weight of a recycled polypropylene resin, 30 to 40% by weight of a recycled polyethylene resin, and 1 to 5% by weight of a recycled polystyrene resin, 50 to 65% by weight of the paper pellet, 15 to 25% by weight of the recycled resin, 10 to 30% by weight of the foamable polypropylene resin, and 10 to 20% by weight of the water are charged into the extruder, the paper pellet, the recycled resin, and the foamable polypropylene resin are heat-kneaded in the extruder to form a high-temperature fluid, 10 to 20% by weight of the water is added to the high-temperature fluid to cause foaming, and a result of the foaming is extruded from the die to mold the foamed product, and upon extruding the result of the foaming from the die, rod-like elements are each formed to have a skin layer without bubbles and a foam layer covered with the skin layer, where adjacent rod-like elements are tightly connected to each other in a molten state.

By mixing the paper pellet, the recycled resin, and the foamable polypropylene resin and extruding the mixture by the extruder in this way, the foamed product in which each raw material is uniformly mixed can be obtained even in the case where the recycled resin is used as a raw material.

In addition, in the above-mentioned manufacturing method, upon extruding the result of the foaming from the die, rod-like elements are each formed to have a skin layer without bubbles and a foam layer covered with the skin layer, where adjacent rod-like elements are tightly connected to each other in a molten state. This allows skin layers without bubbles to be tightly connected to each other in a molten state, so that the foamed product of high mechanical strength and high thermal insulation performance can be obtained.

DESCRIPTION OF THE PREFERRED EMBODIMENTS

The following describes a foamed product and a manufacturing method of the foamed product according to the present invention, with reference to FIGS. 1 to 4.

Figure 1:
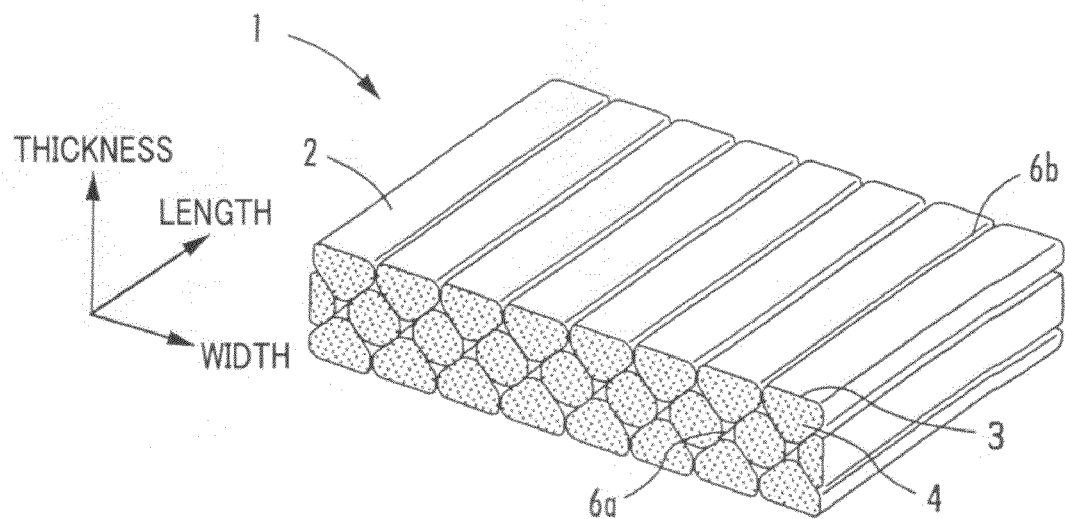
FIG. 1 is an explanatory view showing a state where a part of a foamed product according to the present invention is cut out.

FIG. 1 is an explanatory view showing a foamed product 1 in an embodiment of the present invention. As shown in FIG. 1, the foamed product 1 in this embodiment is a plate-like foamed product formed by connecting a plurality of rod-like elements 2 extending in an axial direction. Though FIG. 1 shows a partially enlarged view of the foamed product 1 in this embodiment, the foamed product 1 is actually 1 m in width, 1 m in length, and 30 mm in thickness.

Figure 2:
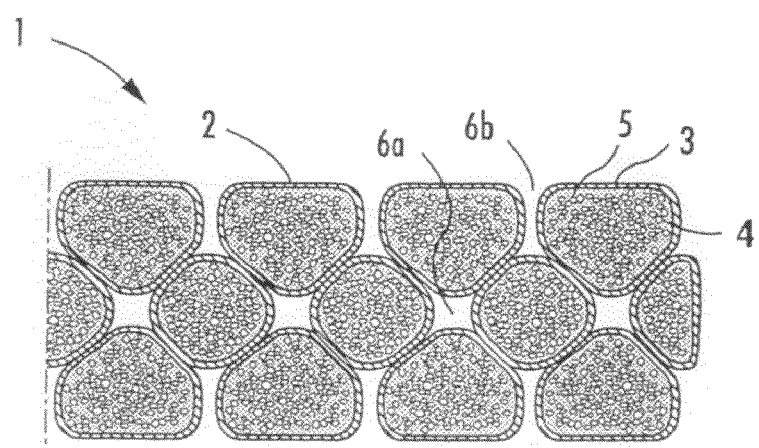
FIG. 2 is a partially enlarged schematic view showing a state of a cut surface in FIG. 1.

Each rod-like element 2 has a two-layer structure of a skin layer 3 and a foam layer 4, as shown in FIGS. 1 and 2. A large number of bubbles 5 exist in the foam layer 4. The rod-like elements 2 are in a state where skin layers 3 on their surfaces are tightly connected to each other. Moreover, there are voids 6a between the rod-like elements 2, forming grooves 6b on the surface of the foamed product 1, as shown in FIG. 1.

Figure 3:
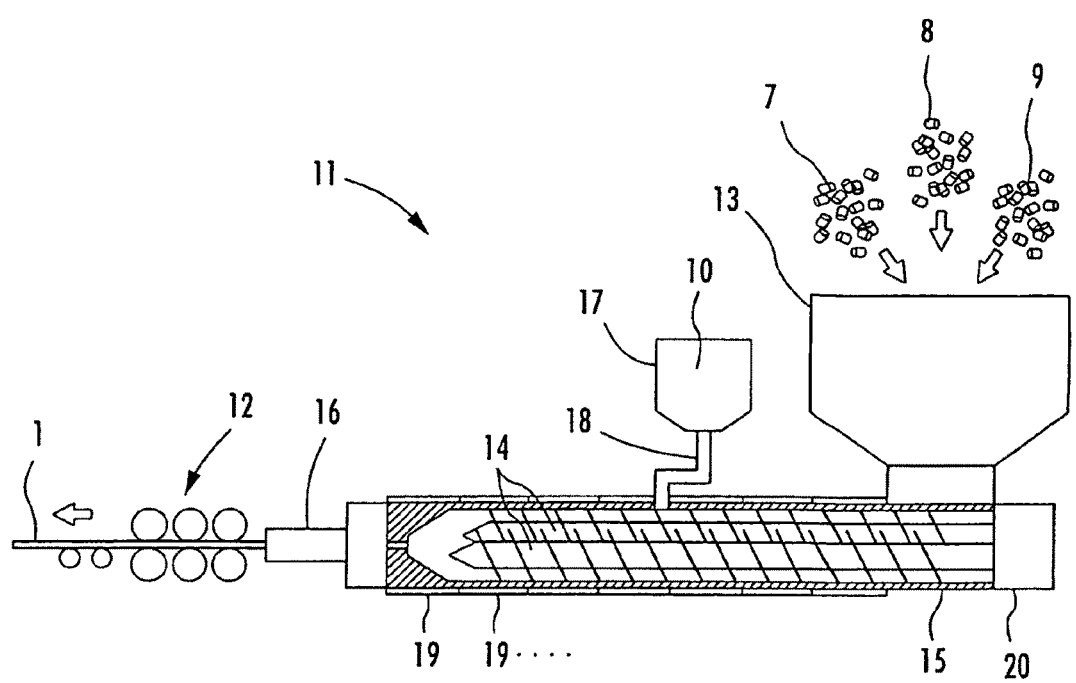
FIG. 3 is an explanatory view showing an extruder used in a manufacturing method of the foamed product according to the present invention.

Main raw materials of the foamed product 1 in this embodiment are a paper pellet 7, a recycled resin pellet 8, and a foamable resin pellet 9, with water 10 being used for foaming (see FIG. 3).

The paper pellet 7 is manufactured by mixing 35 to 50% by weight of a fine paper powder obtained by grinding used paper into a fine powder, and 50 to 65% by weight of starch which is a hydrophilic macromolecule. When doing so, additives such as an antioxidant and a fungicide are added according to purposes and applications. For example, as the used paper, roll paper which has become industrial waste is coarsely grinded to about 2 mm square, and then finely grinded to 30 to 200 µm in particle diameter using a solid roller mill not shown. As the starch, typically used industrial starch is employed.

The recycled resin pellet 8 is a container re-pellet obtained by recycling containers made of synthetic resin. Though the recycled resin pellet 8 slightly differs in component ratio depending on the recycled container type, in this embodiment the recycled resin pellet 8 is a mixture of 55 to 65% by weight of polypropylene, 30 to 40% by weight of polyethylene, and 1 to 5% by weight of polystyrene, and is molded in pellet form.

The foamable resin pellet 9 is a foamable polypropylene in this embodiment. Polypropylene typically has poor tensile strength in a molten state and so has low foamability. Accordingly, polypropylene is not suitable for use in a foamed product. In recent years, however, foamable polypropylene with strengthened melt tension (so-called "high melt strength polypropylene" or HMS-PP) has also been developed. As well understood by persons skilled in this art, for example, as evidenced in U.S. Pat. No. 6,596,814 and U.S. Patent Application Publication No. 2007-0004861, such high melt strength polypropylenes are typically defined as having a melt tension of at least 5 centiNewtons (cN) at 230° C. In this embodiment, "NEWFOAMER" made by Japan Polypropylene Corporation is used as one such foamable polypropylene.

In this embodiment, a ratio of these main raw materials is set in a range where the paper pellet 7 is 50 to 65% by weight, the recycled resin pellet 8 is 15 to 25% by weight, the foamable resin pellet 9 is 10 to 30% by weight, and the water 10 is 10 to 20% by weight. A foamed product having a foam expansion ratio of 30 to 50 times is obtained by setting the ratio of the main raw materials in the above-mentioned range in this embodiment. Since the foamed product 1 in this embodiment has such a foam expansion ratio, a foamed product with a width of 0.9 m to 1.0 m required as a residential heat insulator can be molded.

The following describes a manufacturing method of the foamed product 1 in this embodiment, with reference to FIG. 3. The foamed product 1 in this embodiment is manufactured by charging the paper pellet 7, the recycled resin pellet 8, and the foamable resin pellet 9 into an extruder 11, adding water to these raw materials to cause foaming while melt-kneading them in the extruder 11, and adjusting the foamed product in thickness by a thickness adjustment roller 12.

The extruder 11 includes a hopper 13 into which the raw materials are charged, a cylinder 15 having biaxial screws 14 inside, and a die 16 provided at a downstream end of the cylinder 15. In addition, a water supply line 18 for mixing the water 10 in a tank 17 with the mixture inside the cylinder 15 is provided at an intermediate position of the cylinder 15. Moreover, a plurality of heaters 19 for heating the inside of the cylinder 15 are arranged in the cylinder 15 in an axial direction of the cylinder 15. Further, a motor 20 for rotating the screws 14 is provided upstream of the cylinder 15.

The die 16 extrudes the molten raw material mixture, which is pushed out from an exit of the cylinder 15, to the outside from small openings not shown, thereby forming the foamed product 1. The thickness adjustment roller 12 is provided downstream of a tip of the die 16. The thickness adjustment roller 12 adjusts, by a distance between metal rollers disposed on upper and lower sides and their pressing elastic force, the thickness of the object passing between the rollers.

The above-mentioned raw materials that are adjusted in supply amount are charged into the hopper 13 of the extruder 11, from a raw material supply not shown. The raw materials charged into the hopper 13 are supplied into the cylinder 15, and heated by the heaters 19 while being stirred by the two screws 14 in the cylinder 15, thereby being melt-mixed.

In this state, the paper pellet 7, the recycled resin pellet 8, and the foamable resin pellet 9 as the raw materials are kneaded with each other, so that the fine paper powder and starch included in the paper pellet 7, recycled polypropylene, polyethylene, and polystyrene included in the recycled resin pellet 8, and foamable polypropylene included in the foamable resin pellet 9 are kneaded with each other. The raw materials in the cylinder 15 are melt-kneaded by the screws 14 while being heated by the heaters 19, and conveyed downstream. During this, the molten mixture of the fine paper powder, starch, and the various synthetic resins is uniformly kneaded, as a result of which the fine paper powder is uniformly dispersed in the whole mixture.

Moreover, the heated water 10 is supplied from the water supply line 18, and mixed with the molten raw material mixture. The water 10 supplied into the raw material mixture is heated by the molten raw materials and the heaters 19 and as a result vaporized, thereby forming a large number of bubbles 5 in the raw material mixture.

The raw material mixture to which the water 10 is added in this way is then extruded from the die 16. The raw material mixture extruded from the small openings of the die 16 not shown is released under atmospheric pressure. This causes the bubbles 5 in the raw material mixture to expand, as a result of which the plurality of rod-like elements 2 are formed. The rod-like elements 2 are each formed to have the skin layer 3 and the foam layer 4, when extruded from the small openings of the die 16. Here, the skin layers 3 of the adjacent rod-like elements 2 contact with each other, where the raw materials forming the skin layers 3 are still in a molten state. Hence, the adjacent rod-like elements 2 are tightly connected to each other, thereby forming the foamed product 1.

After this, the foamed product 1 is cooled while being adjusted to a constant thickness by the thickness adjustment roller 12, and conveyed downstream. The foamed product 1 is then cut to a desired length.

EXAMPLE

The following describes an example of the present invention. In the foamed product 1 of the example, the fine paper powder in the paper pellet 7 is 20% by weight and starch in the paper pellet 7 is 37% by weight, to the whole foamed product 1. The recycled resin pellet 8 is 13% by weight to the whole foamed product 1. The foamable resin pellet 9 is 30% by weight to the whole foamed product 1. The foamed product 1 also includes 1% by weight of "ADK STAB" made by ADEKA Corporation as an antioxidant, and 1% by weight of calcium from calcined scallop shells as a fungicide.

Roll paper treated as industrial waste is used as the raw material of the fine paper powder. Industrial starch in widespread use is used as the starch.

The composition of the recycled resin pellet 8 itself is 60% by weight of polypropylene, 35% by weight of polyethylene, and 5% by weight of polystyrene. Further, 16% by weight of the water 10 is added to the mixture of the fine paper powder, starch, and the various synthetic resins for foaming.

Figure 4A:
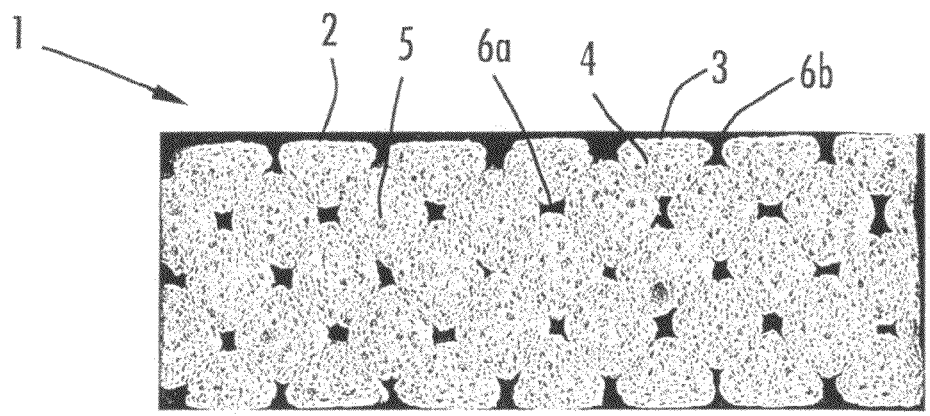
FIG. 4 is a photograph showing a cross section and a surface of a foamed product which is an example of the present invention.
Figure 4B:
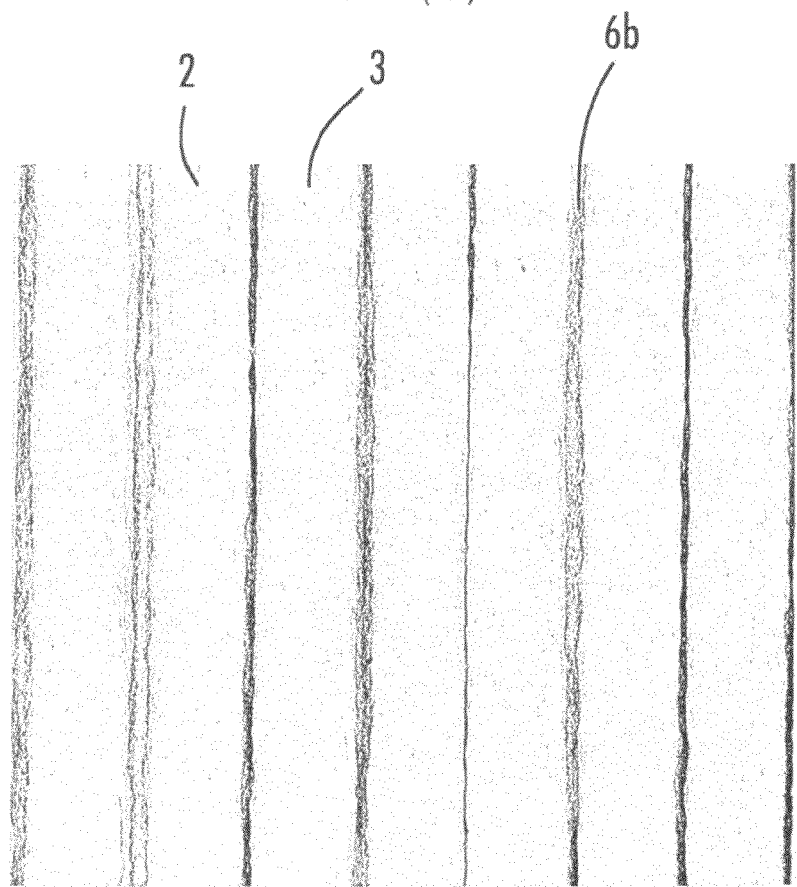

FIG. 4(a) shows a state of a cross section of the foamed product 1 of the example, and FIG. 4(b) shows a state of a surface of the foamed product 1 of the example. As shown in FIG. 4(a), the skin layer 3 has a smooth surface without bubbles. The thickness of the skin layer 3 is about 20 µm on average, as a result of measurement based on FIG. 4(a). Meanwhile, the bubbles 5 in the foam layer 4 are 200 µm in average diameter, as a result of measurement based on FIG. 4(a). As is clear from FIG. 4(a), most of the bubbles are closed cells.

Moreover, components of the skin layer 3 and the foam layer 4 of the foamed product 1 were analyzed using an infrared absorption spectrum at the Tokyo Metropolitan Industrial Technology Research Institute which is a local independent administrative agency. As a result, it was found that the skin layer 3 and the foam layer 4 both show the same spectral waveform, and have a uniform mixture of polypropylene, polyethylene, and polystyrene as the raw materials.

Thus, in the foamed product 1 of the example, polypropylene and polyethylene, which have conventionally been difficult to mix uniformly, are mixed uniformly. This demonstrates that, according to the present invention, a foamed product of stable quality can be obtained even when using, as a raw material, a container re-pellet which inevitably includes the two synthetic resins.

Furthermore, the foamed product 1 of the example exhibits thermal conductivity of 0.035 W/mK on average when used as a heat insulator. Since the foamed product 1 has a thickness of 30 mm, i.e., 0.03 m, converting to thermal resistance yields 0.86.

Accordingly, the foamed product 1 of the example achieves thermal resistance of 2.29, when two foamed products of 30 mm in thickness and one foamed body of 20 mm in thickness are overlaid to have a thickness of 80 mm. The foamed product 1 having such thermal resistance can meet a requirement (2.2) as a floor heat insulator for next-generation energy-saving houses.

Figure 5A:
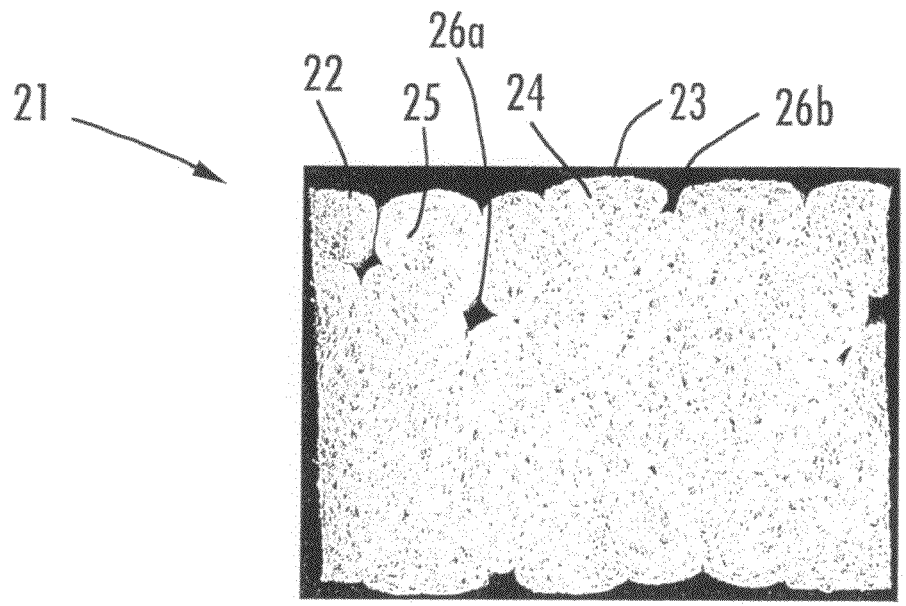
FIG. 5 is a photograph showing a cross section and a surface of a foamed product which is a comparative example.

A comparative example in which only the foamable resin pellet 9 is used as a raw material without using the recycled resin pellet 8 while the other raw materials and the manufacturing method are the same as the above-mentioned example is described below. As shown in FIG. 5(a), a foamed product 21 of the comparative example has rod-like elements 22 that are each separated into a skin layer 23 and a foam layer 24 like the foamed product 1, but the skin layer 23 is extremely thin with an average thickness of about 10 μm.

Figure 5B:
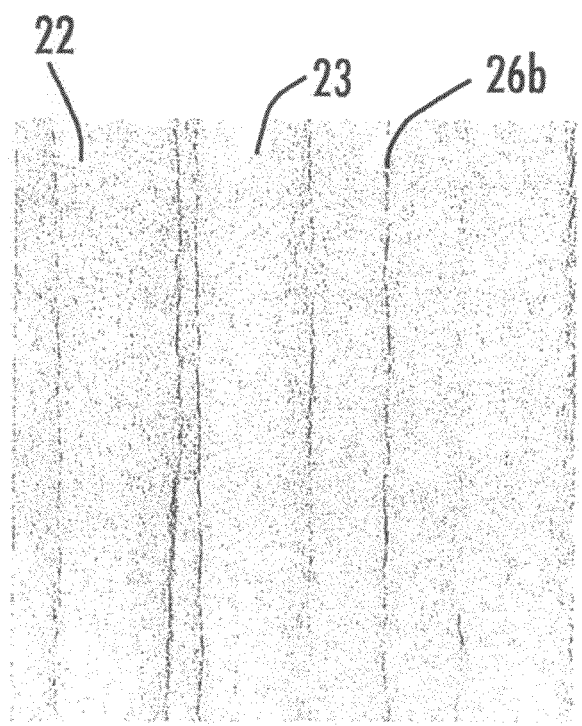

Besides, as shown in FIG. 5(b), though there are no bubbles 25 on the surface of the foamed product 21, the inside bubbles 25 are visible from the outside. An average diameter of the bubbles 25 in the foam layer 24 as calculated based on FIG. 5(a) is about 100 μm.

Moreover, the rod-like elements 22 in the foamed product 21 are in close contact with each other with almost no gaps, and there are almost no voids 26a unlike the foamed product 1. Furthermore, grooves 26b on the surface are narrow and have a shallow depth, as compared with the grooves 6b of the example.

As a result of measuring the mechanical strength of the foamed product 1 of the example, the foamed product 1 exhibits bending strength of 0.058 MPa. On the other hand, the foamed product 21 of the comparative example has much lower bending strength than the example. Thus, the foamed product 1 of the example has high mechanical strength because the skin layers 3 of the plurality of rod-like elements 2 are firmly and tightly connected to each other, as compared with the case of using only the foamable resin pellet 9.

This difference in mechanical strength is mainly attributable to the difference in thickness of the skin layer 3 and the difference in degree of tight connection between the rod-like elements 2. The average bubble diameter is about 200 μm in the foamed product 1 and about 100 μm in the foamed product 21 of the comparative example. Superior thermal insulation performance and mechanical strength of the foamed product 1 of the example despite its larger average bubble diameter indicates that the thickness of the skin layer 3 plays a significant role.

In addition, even when a force is applied to separate each rod-like element 2 in the foamed product 1 of the example, each rod-like element 2 is not easily separated. In the case of the foamed product 21 of the comparative example, however, each rod-like element 22 can be separated relatively easily.

Furthermore, in the foamed product 1 of the example, the paper pellet 7 occupies at least 50% of the total weight of the foamed product 1. Accordingly, the foamed product 1 itself is not subject to recycling in the Law for Recycling of Containers and Packaging, and can be disposed as general waste. Besides, calculating a calorific value of the foamed product 1 yields about 5900 cal/g. Since the foamed product 1 has such a low calorific value, there is no possibility that an incinerator is damaged in the case of incineration disposal.

Though industrial waste roll paper is used as the fine paper powder in the above embodiment, the raw material of the fine paper powder is not limited to this, and may be any of various used paper such as old newspapers, old magazines, printed paper, used wrapping paper, used corrugated paper, used OA paper, broken paper or damaged paper during manufacture of virgin paper, and cutting wastage, abrasive powders, shredder scrap of magazines and the like. Waste paper is discharged in large quantity from offices, publishing companies, paper-manufacturing companies, and the like, and evaluated to have substantially no environmental burden. Note that the average particle diameter of the paper powder is measured using a laser diffraction particle size distribution measurement device (Mastersizer S made by Malvern Instruments Ltd.).

Though starch is used as a hydrophilic macromolecule in the above embodiment, there is no particular limit on starch, as maize starch, sweet potato starch, potato starch, wheat starch, barley starch, rice starch, and the like may be used. Moreover, the hydrophilic macromolecule may be glue, natural rubber, or agar, instead of starch.

Though the foamed product 1 has a dimension suitable as a residential heat insulator in the above embodiment, the foamed product 1 is not limited to use as a residential heat insulator, and may be used for various applications such as a shock absorber, a sound insulator, and a cold insulator. In addition, the foamed product 1 may be molded in various shapes according to applications.

Though "NEWFOAMER" made by Japan Polypropylene Corporation is used as foamable polypropylene in the above embodiment, this is not a limit for the present invention, and foamable polypropylene having similar properties may be used.

What is claimed is:
1. A foamed product formed by heat-mixing and foaming:
a paper pellet that is a mixture of 35 to 50% by weight of a fine paper powder having a particle diameter of 30 to 200 μm and 50 to 65% by weight of a hydrophilic macromolecule;
a recycled resin that is a mixture of 55 to 65% by weight of a recycled polypropylene resin, 30 to 40% by weight of a recycled polyethylene resin, and 1 to 5% by weight of a recycled polystyrene resin;
a high melt strength foamable polypropylene resin having a melt tension of at least 5 cN at 230° C.; and
water,
wherein the paper pellet is 50 to 65% by weight, the recycled resin is 15 to 25% by weight, and the high melt strength foamable polypropylene resin is 10 to 30% by weight, the water is in a range of 10 to 20% by weight to the paper pellet, the recycled resin, and the high melt strength foamable polypropylene resin, the foamed product is formed by extruding charged materials from a die and passing the extruded materials between rollers to produce tightly connected surfaces of a plurality of rod-like elements, each of the rod-like elements has, on a surface thereof, a skin layer having no bubbles, the skin layer covering an inside foam layer, the skin layer is 15 to 25 μm in average thickness and exhibits an infrared absorption spectral waveform equivalent to that of the foam layer, and voids are formed between the rod-like elements, the voids forming grooves on substantially planar exterior surfaces of the foamed product.

2. The foamed product according to claim 1, wherein the skin layer and the foam layer are made by uniformly mixing the recycled polypropylene resin and the high melt strength foamable polypropylene resin with the recycled polyethylene resin.

3. The foamed product according to claim 1, wherein said foamed product exhibits a bending strength of at least 0.058 MPa.

4. A method of manufacturing a foamed product by charging a paper pellet, a recycled resin, a high melt strength foamable polypropylene resin having a melt tension of at least 5 cN at 230° C., and water into an extruder and extruding charged materials from a die provided on an extrusion side of the extruder, the paper pellet being a mixture of a fine paper powder having a particle diameter of 20 to 200 μm, a hydrophilic macromolecule, and water, and the recycled resin being a mixture of a polyethylene resin, a polypropylene resin, and a polystyrene resin, wherein the paper pellet includes 35 to 50% by weight of a fine paper powder and 50 to 65% by weight of a hydrophilic macromolecule, the recycled resin includes 55 to 65% by weight of a recycled polypropylene resin, 30 to 40% by weight of a recycled polyethylene resin, and 1 to 5% by weight of a recycled polystyrene resin, 50 to 65% by weight of the paper pellet, 15 to 25% by weight of the recycled resin, 10 to 30% by weight of the high melt strength foamable polypropylene resin, and 10 to 20% by weight of the water are charged into the extruder, the paper pellet, the recycled resin, and the high melt strength foamable polypropylene resin are heat-kneaded in the extruder to form a high-temperature fluid, 10 to 20% by weight of the water is added to the high-temperature fluid to cause foaming, and a result of the foaming is extruded from the die to mold the foamed product, and upon extruding the result of the foaming from the die and passing the extruded materials between rollers, rod-like elements are each formed to have a skin layer without bubbles and a foam layer covered with the skin layer, where adjacent rod-like elements are tightly connected to each other in a molten state, the skin layer is 15 to 25 μm in average thickness and exhibits an infrared absorption spectral waveform equivalent to that of the foam layer, and voids are formed between the rod-like elements, the voids forming grooves on substantially planar exterior surfaces of the foamed product.

5. The method of manufacturing a foamed product according to claim 4, wherein said foamed product exhibits a bending strength of at least 0.058 MPa.

\* \* \* \* \*